United States Patent
Dhawan et al.

(10) Patent No.: US 12,556,519 B2
(45) Date of Patent: Feb. 17, 2026

(54) SYSTEM AND METHOD FOR TRACKING DATA TRANSFERRED IN A DISTRIBUTED NETWORK VIA SECURED, LAYERED DATA TAGGING

(71) Applicant: BANK OF AMERICA CORPORATION, Charlotte, NC (US)

(72) Inventors: Lalit Dhawan, Cranbury, NJ (US); Manu Jacob Kurian, Dallas, TX (US); Sanjeev Verma, Harrisburg, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 460 days.

(21) Appl. No.: 18/092,609

(22) Filed: Jan. 3, 2023

(65) Prior Publication Data

US 2024/0223536 A1    Jul. 4, 2024

(51) Int. Cl.
*H04L 9/40* (2022.01)
*H04L 41/22* (2022.01)

(52) U.S. Cl.
CPC .......... *H04L 63/0414* (2013.01); *H04L 41/22* (2013.01); *H04L 63/20* (2013.01)

(58) Field of Classification Search
CPC ...... G06F 21/62; G06F 21/78; G06F 21/6245; G06F 2221/2113; H04L 2463/101; H04L 63/0428; H04L 63/10; H04L 63/105
See application file for complete search history.

(56) References Cited

U.S. PATENT DOCUMENTS

| | | | |
|---|---|---|---|
| 8,693,323 | B1 * | 4/2014 | McDysan ............... H04L 45/50 370/392 |
| 9,948,547 | B2 | 4/2018 | Agarwal |
| 9,989,724 | B2 | 6/2018 | Raza et al. |
| 10,346,635 | B2 | 7/2019 | Kumar et al. |
| 10,412,615 | B2 | 9/2019 | Edsall et al. |
| 10,601,718 | B2 | 3/2020 | Twombly et al. |
| 10,608,918 | B2 | 3/2020 | Twombly et al. |
| 10,609,156 | B2 | 3/2020 | Twombly et al. |
| 10,698,902 | B2 | 6/2020 | Lee et al. |
| 10,714,145 | B2 | 7/2020 | Kulkarni et al. |
| 10,716,060 | B2 | 7/2020 | Twombly et al. |
| 10,812,486 | B2 | 10/2020 | Delson et al. |
| 11,256,821 | B2 | 2/2022 | Avidan et al. |
| 11,341,167 | B2 | 5/2022 | Gibson et al. |
| 2017/0031963 | A1 | 2/2017 | Merz et al. |
| 2017/0048275 | A1 | 2/2017 | John et al. |
| 2020/0162477 | A1 * | 5/2020 | Kurian ............... H04L 63/0876 |

* cited by examiner

Primary Examiner — Brian F Shaw
(74) Attorney, Agent, or Firm — Moore & Van Allen PLLC; Andrew T. Wood

(57) ABSTRACT

Embodiments of the invention are directed to systems, computer program products, and methods for tracking data transferred in a distributed network via secured, layered data tagging. A checkpoint sensing engine collects data flow at a checkpoint device and verifies a match between a checkpoint tag of the transaction packet and a checkpoint identifier of the checkpoint device. If no match occurs, the transaction packet it transmitted to a quarantine unit. If a match occurs, a deconstruction engine then removes the checkpoint tag, exposing an underlying second checkpoint tag corresponding with a second checkpoint device. Thereafter, the transaction packet is transmitted to the second checkpoint device.

15 Claims, 8 Drawing Sheets

SYSTEM AND METHOD FOR TRACKING DATA TRANSFERRED IN A DISTRIBUTED NETWORK VIA SECURED, LAYERED DATA TAGGING

FIELD OF THE INVENTION

The present invention embraces a system and method of tracking data transferred in a distributed network via secured, layered data tagging.

BACKGROUND

Currently, entities transfer data within an electronic network and require that the data be transferred from an origin to a target database. In some instances, the data may also pass through one or more intermediary checkpoints between the origin and target database, both globally and domestically. Accordingly, certain data to be transferred both within and outside the entity must maintain a strict level of security such as to not expose sensitive information to nefarious actors. In this way, proper routing of the data to the target database and any intermediary checkpoints must be maintained. Current techniques are still prone to incorrect data routing, as they rely on systems decoupled from the data itself. Accordingly, there may be scenarios where the chain-of-custody of any given data is unknown, and thus a confidence in the underlying data is questioned. As a result, the needs of the entity are unmet and thus results in a loss of productivity, added expenses, unexpected delays, or the like. As such, there is a need for a system and method for tracking data transferred in a distributed network via secured, layered data tagging.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later. Embodiments of the invention are directed to a system, method, or computer program product for tracking data transferred in a distributed network via secured, layered data tagging, the invention may include collecting, by a checkpoint sensing engine, data flow at a first checkpoint device, the data flow relating to network traffic passing from the first checkpoint device to a second checkpoint device, wherein the data flow may include at least one transaction packet, the at least one transaction packet including a checkpoint tag group, wherein the checkpoint tag group may include at least one checkpoint tag, verifying, by the checkpoint sensing engine, a match between a first checkpoint tag of the at least one transaction packet and a checkpoint identifier of the first checkpoint device, transmitting a notification to an endpoint device, the notification including an identification of the match or no match, and displaying the notification on a user interface of the endpoint device.

In some embodiments, the system, method, or computer program product may also include removing, by a tag deconstruction engine, the first checkpoint tag of the at least one transaction packet upon a verification of a match between the first checkpoint tag and the checkpoint identifier, wherein the removing of the first checkpoint tag exposes a second checkpoint tag, the second checkpoint tag nested within the first checkpoint tag and corresponding to a checkpoint identifier of the second checkpoint device; and transmitting the at least one transaction packet to the second checkpoint device.

In some embodiments, the system, method, or computer program product may also include transmitting the at least one transaction packet from the first checkpoint device to a quarantine unit if there is a no match between the checkpoint identifier of the first checkpoint device and the first checkpoint tag.

In some embodiments, the at least one transaction packet further comprises at least one data scoring tag.

In some embodiments, if there is a match between the checkpoint identifier of the first checkpoint device and the first checkpoint tag, the notification may include a disposition feature including a first selection and a second selection, the disposition feature configured to communicate with the checkpoint sensing engine to accept, as a result of the first selection, a removal of the first checkpoint tag, and reject, as a result of the second selection, the removal of the first checkpoint tag, and subsequently transmit the at least one transaction packet from the first checkpoint device to a quarantine unit.

In some embodiments, if there is no match between the checkpoint identifier of the first checkpoint device and the first checkpoint tag, the notification may include a disposition feature including a first selection and a second selection, the disposition feature configured to communicate with the checkpoint sensing engine to accept, as a result of the first selection, the transmitting of the transaction packet from the first checkpoint device to a quarantine unit, and reject, as a result of the second selection, the transmitting of the transaction packet from the first checkpoint device to a quarantine unit, and instead remove the first checkpoint tag and transmit the at least one transaction packet to the second checkpoint device.

In some embodiments, the checkpoint sensing engine applies the at least one data scoring tag resulting from a match between a transaction object header and a data attribute table.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
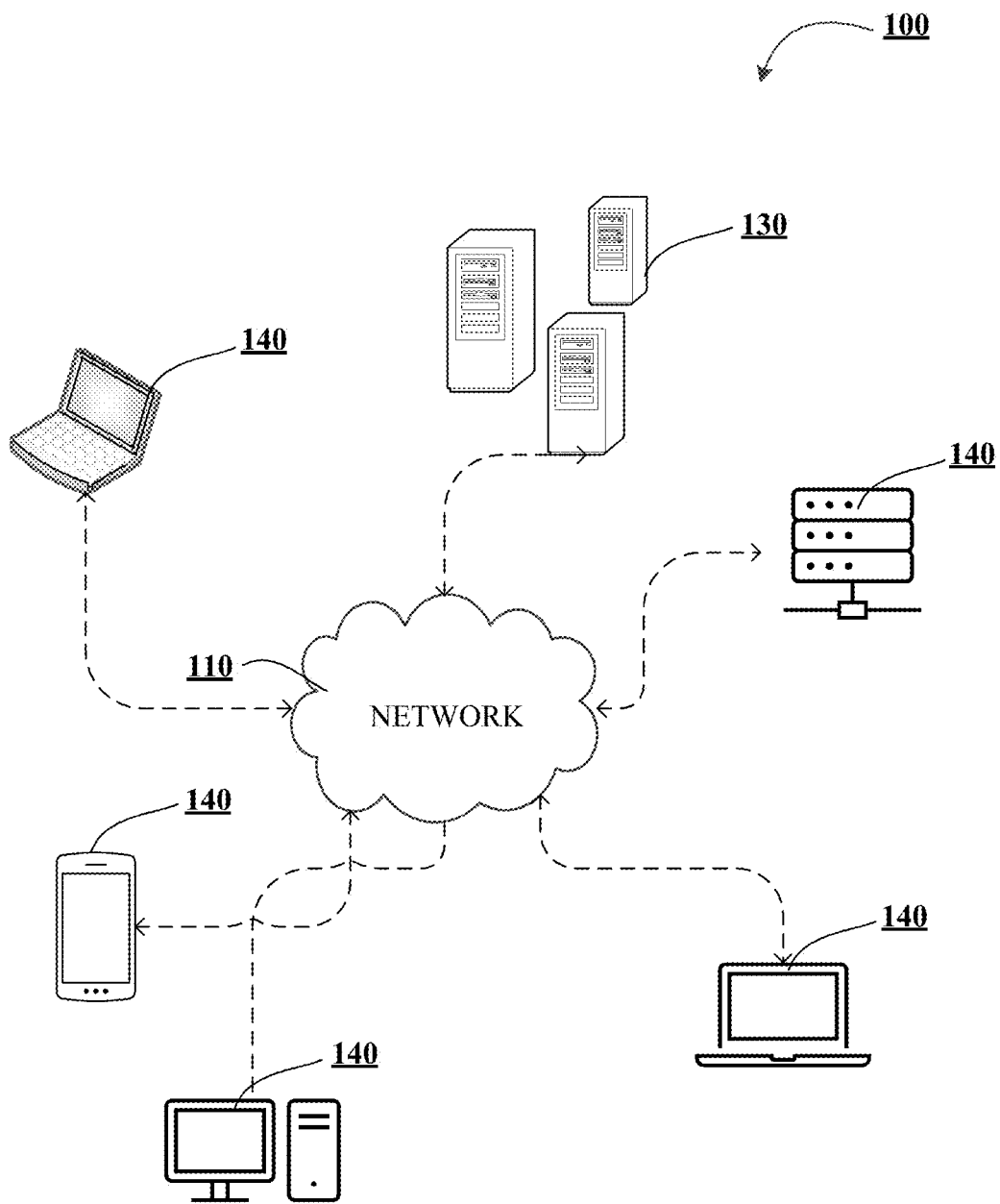
Figure 1B:
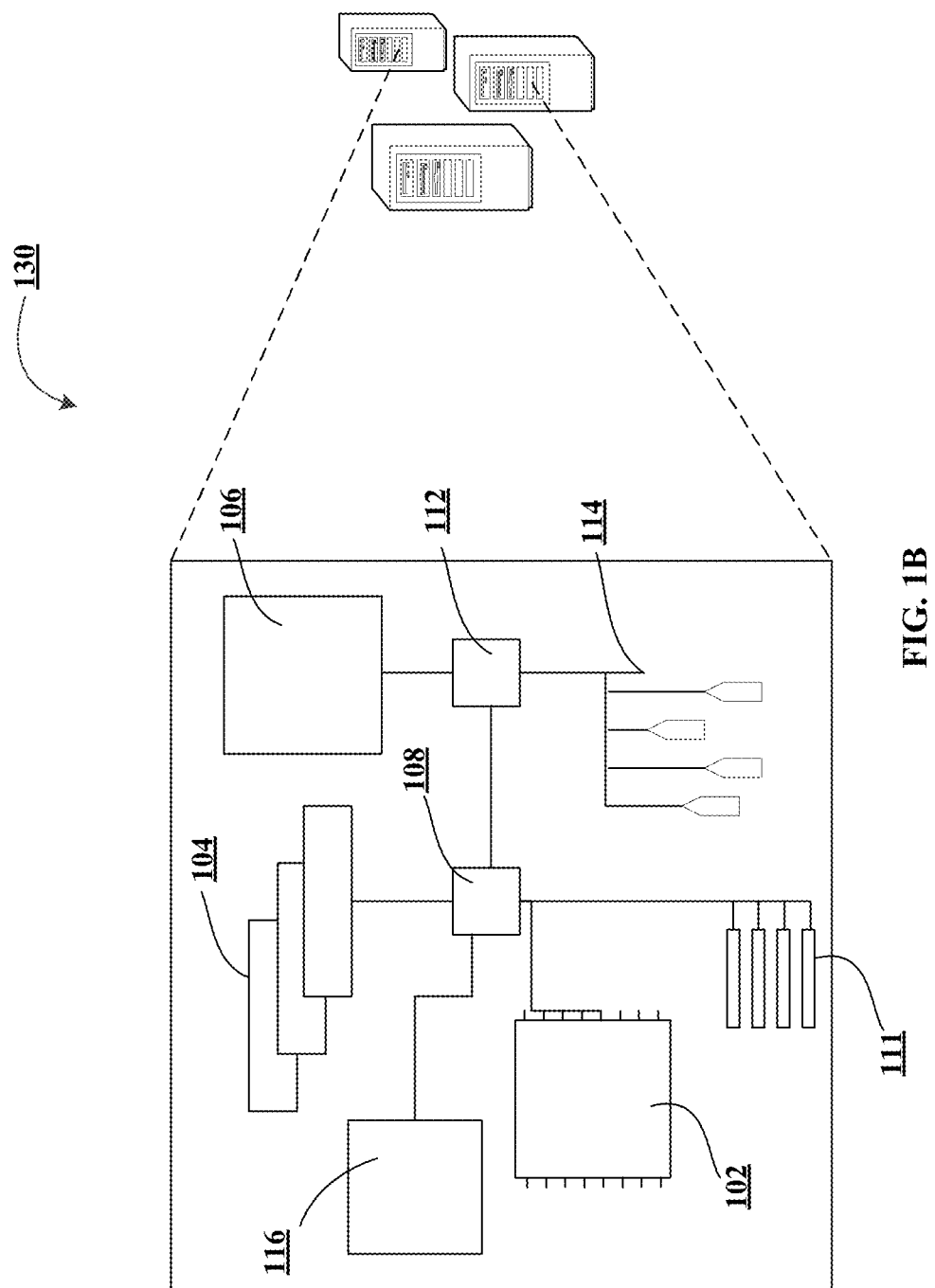
Figure 1C:
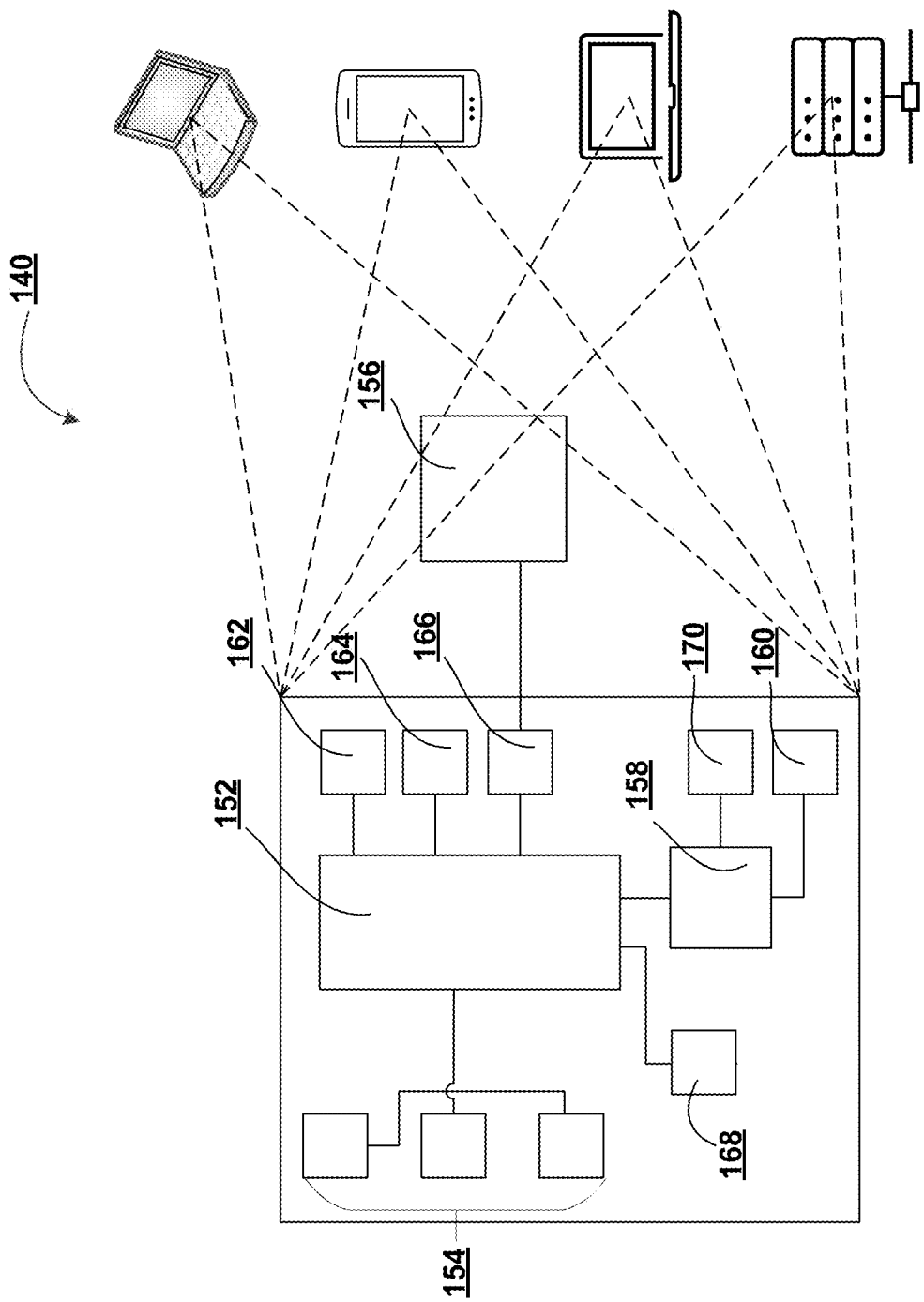
Figure 2A:
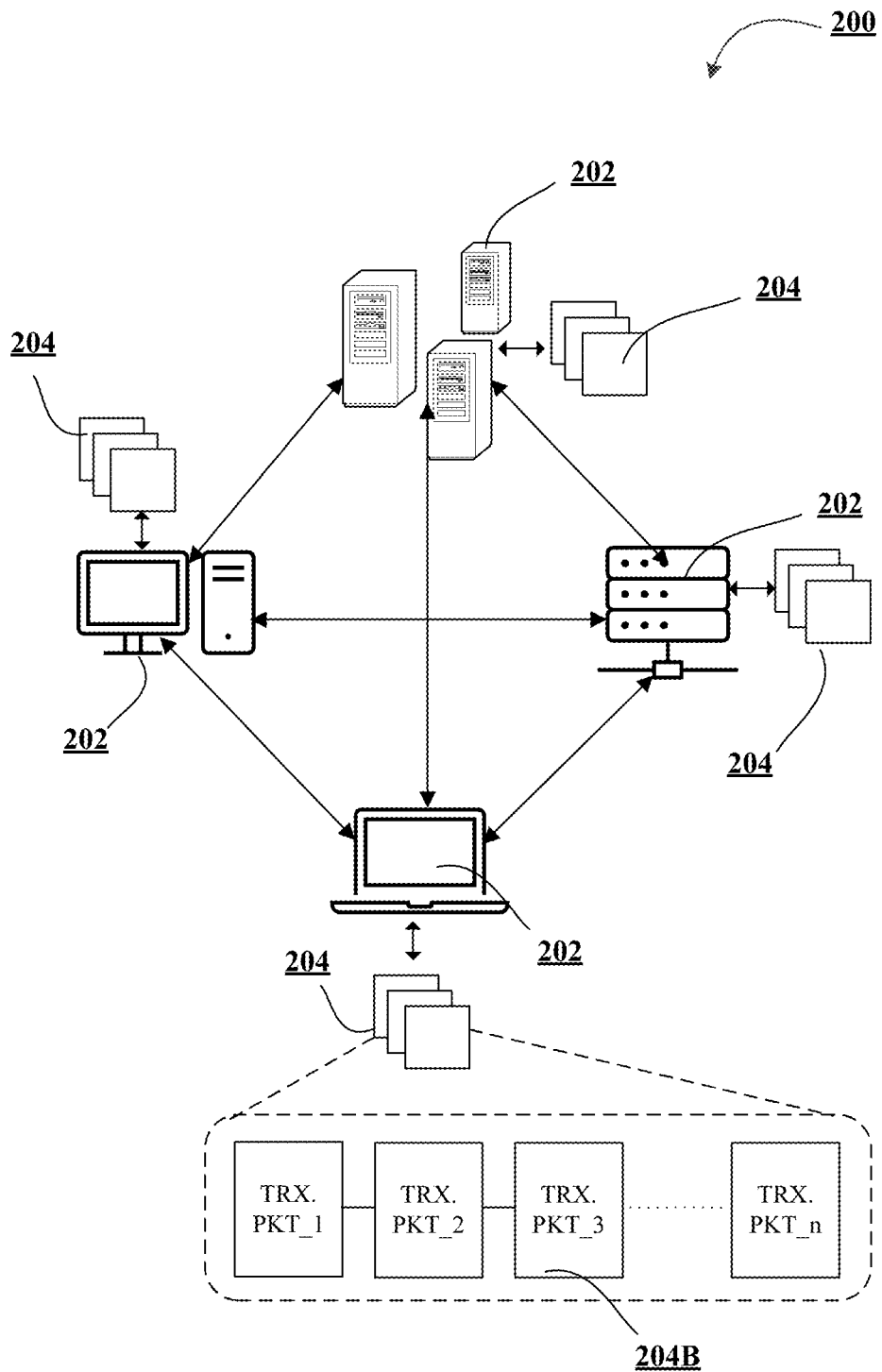
Figure 2B:
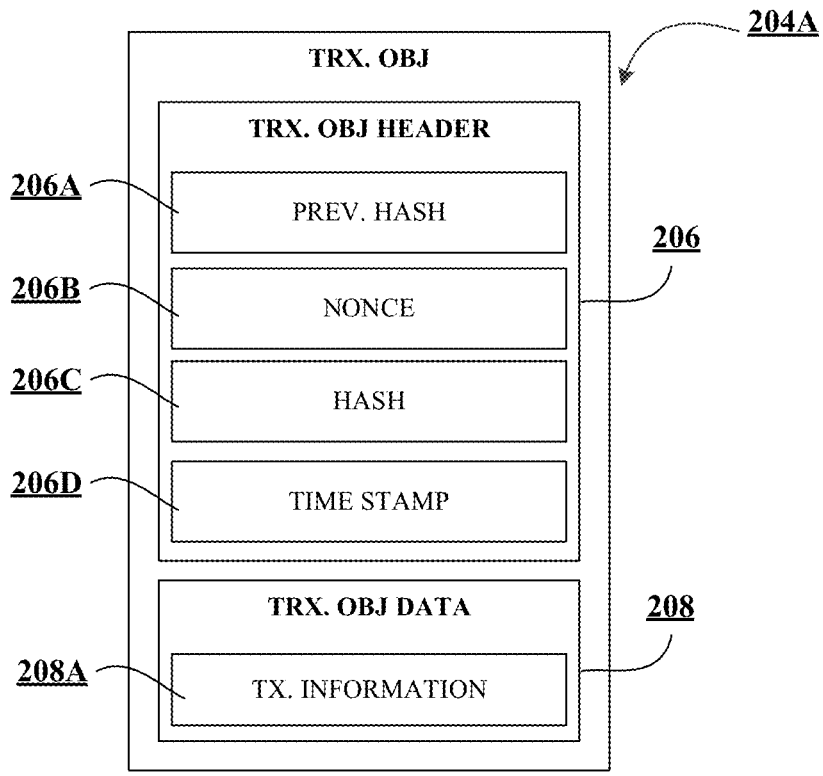
Figure 2C:
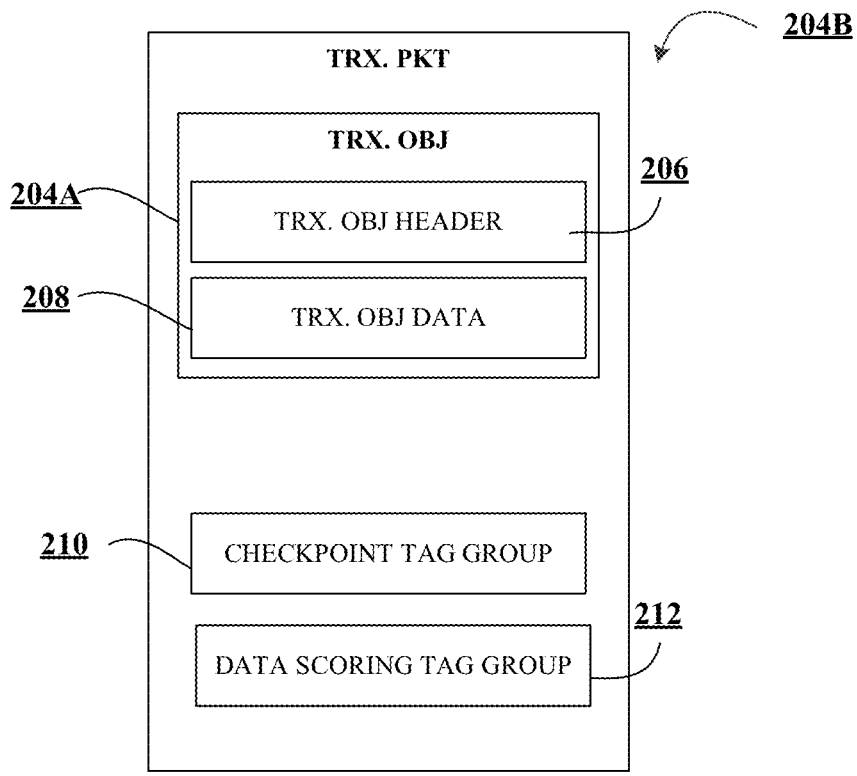
Figure 3:
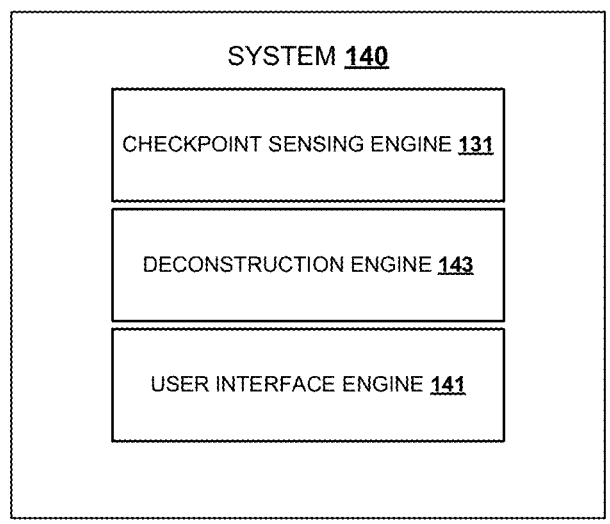
Figure 4:
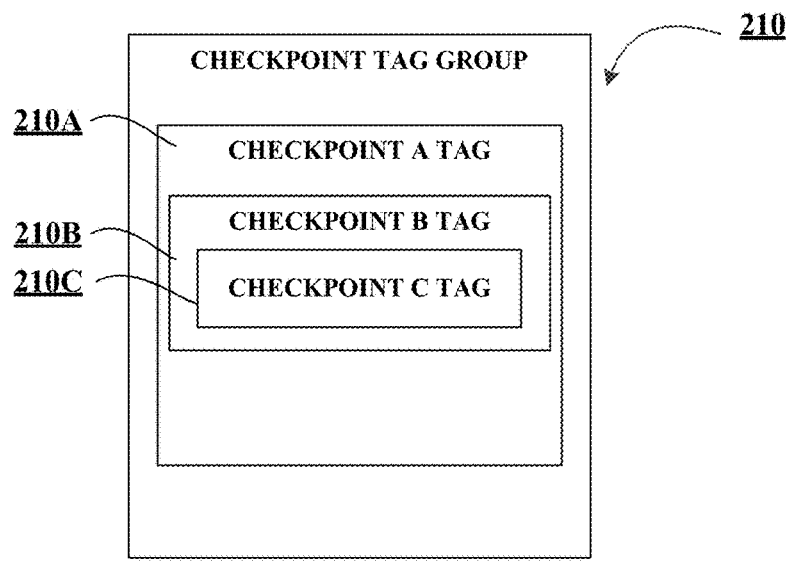
Figure 5:
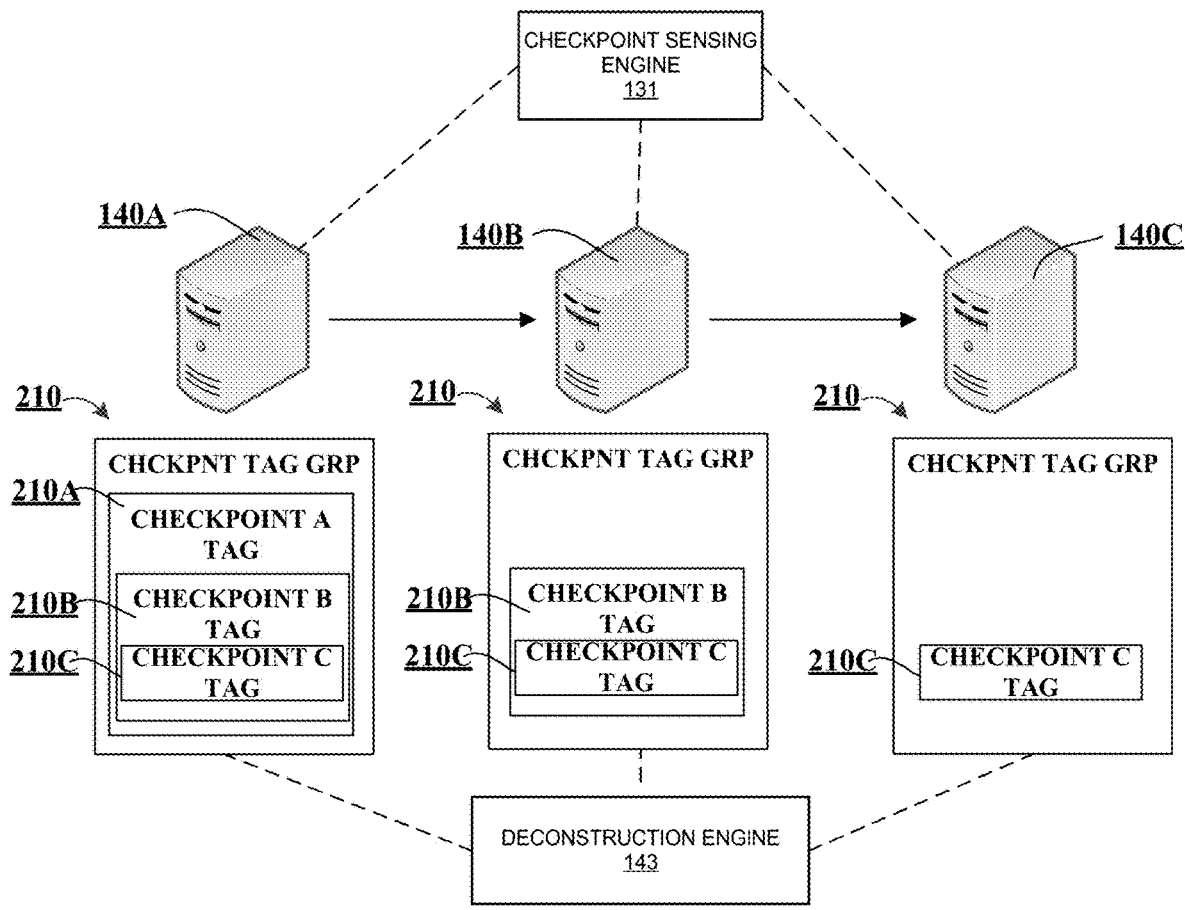
Figure 6:
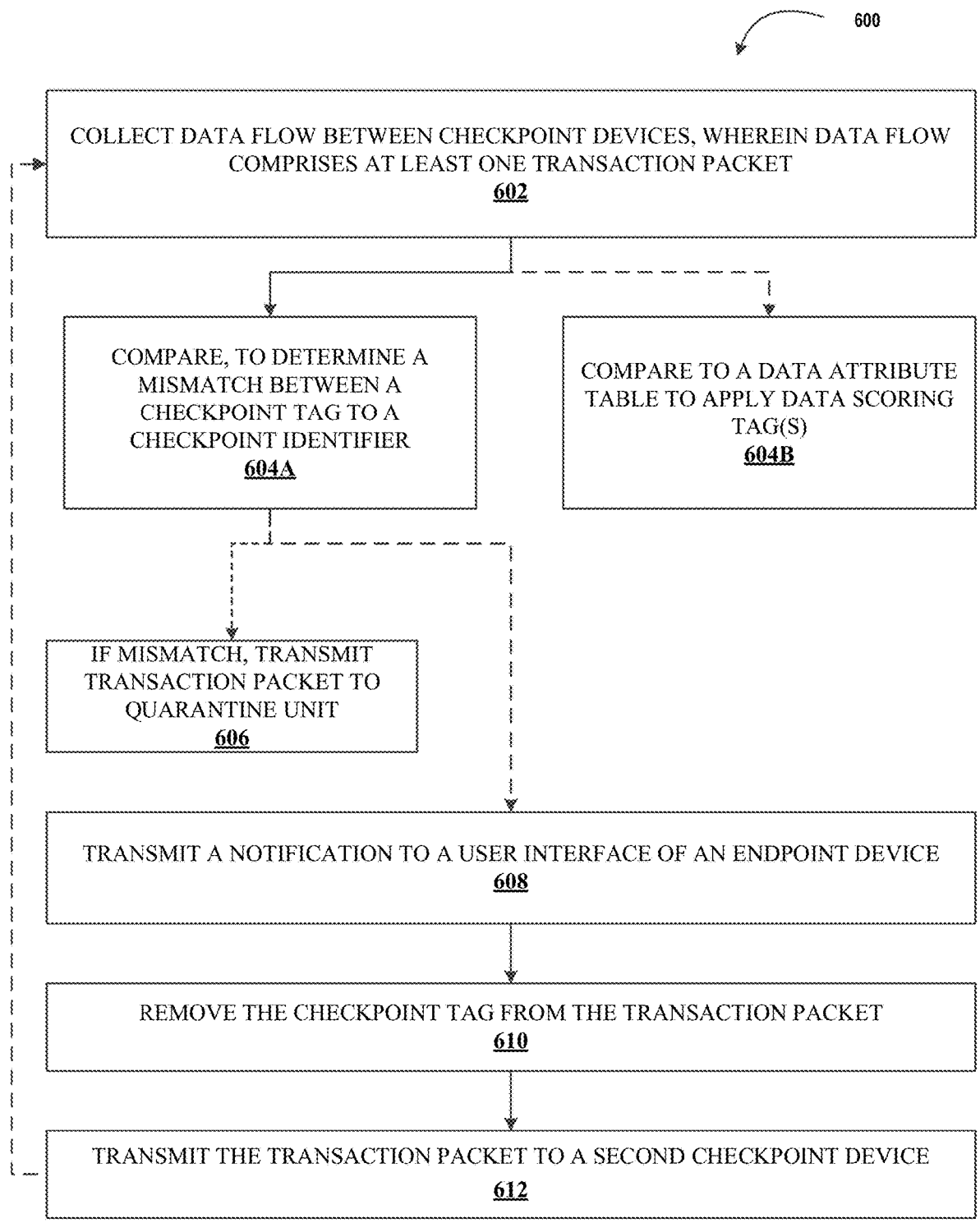

Having thus described embodiments of the invention in general terms, reference will now be made the accompanying drawings, wherein:

FIGS. 1A-1C illustrate technical components of an exemplary distributed computing environment for tracking data transferred in a distributed network via secured, layered data tagging, in accordance with an embodiment of the invention;

FIGS. 2A-2B illustrate an exemplary distributed ledger technology (DLT) architecture, in accordance with an embodiment of the invention;

FIG. 2C illustrates an exemplary transaction packet of the distributed computing environment for tracking data transferred in a distributed network via secured, layered data tagging, in accordance with an embodiment of the invention;

FIG. 3 illustrates a block diagram of components of the system, in accordance with an embodiment of the invention;

FIG. 4 illustrates a block diagram of a checkpoint tag group, in accordance with an embodiment of the invention;

FIG. 5 illustrates a block diagram of a deconstructing process for checkpoint tags, in accordance with an embodiment of the invention;

FIG. 6 illustrates a process flow for tracking data transferred in a distributed network via secured, layered data tagging, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data, such as electronic resource transfer or communication data. Typically, these data can be related to the customers of the entity, its products or services, the people who work for the organization, or any other aspect of the operations of the organization, such as communicative interactions between customers and people who work for the organization. As such, the entity may be any institution, group, association, financial institution, establishment, company, union, authority or the like, employing information technology resources for processing large amounts of data.

As described herein, a "user" may be an individual associated with an entity, or it may be a customer with a transactional relationship with the entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, an "endpoint device" may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

Prior to the invention described herein, entities frequently transferred or transmitted transaction packets (e.g., data) between endpoint devices with regard for sensitivity, but with the underlying transaction packets frequently dependent on outside systems and sensitivity verification engines to ensure the confidentiality and security of such transaction packets. Accordingly, transaction packets often were subject to errors by these outside systems which transferred the transaction packets to the incorrect endpoint device(s), thus causing hesitancy in the receiver to trust the authenticity of the transaction packet once the transaction packet was finally transferred to a target endpoint device. Moreover, since these transaction packets may be sent to the incorrect endpoint device, the underlying data within the transaction packet remained vulnerable to nefarious actors who may have access to the underlying data, and therefore the ability to manipulate or harvest the underlying data for unintended purposes, or the ability to redirect the transfer of the transaction packet elsewhere.

The invention disclosed herein provides for the tracking of data transferred via secured, layered data tagging. The system and method to accomplish such evaluation will accurately and in real-time track data as it is transmitted within the electronic network and determine whether data has been transmitted to a wrong target database. The disclosure herein provides a system for reading and/or generating tags at each checkpoint as data moves through an electronic network, where the system may compare the tags to the tags of the checkpoint at which the data resides. In this manner, the system may compare the tags to determine if the data is allowed to be at the current checkpoint (e.g., where data cannot be transmitted outside the origination country, where data cannot be transmitted beyond a certain time, and/or the like). If the system determines that the data should be at a different location, then the invention can create an alert to the manager of the system and have the data transmitted to the correct location. Accordingly, the invention is useful in preventing data from being sent to the incorrect location and thus the invention improves upon existing data security measures.

Accordingly, the present disclosure provides for a system, method, and computer program product which collects, by a checkpoint sensing engine, data flow at a checkpoint device. At the checkpoint device, the data flow is passing from the origin checkpoint device to a target checkpoint device, and the data flow consists of at least one transaction packet. The transaction packets may include a checkpoint tag group with checkpoint tag(s) therein. The transaction packet may also include data scoring tags, which may be used as indicators for a match between the checkpoint device and the checkpoint tag. Once the checkpoint sensing engine verifies a match between a checkpoint tag of the transaction packet and a checkpoint identifier of the checkpoint device, a deconstruction engine removes the outermost checkpoint tag. The removing of the checkpoint tag exposes an underlying checkpoint tag that was previously nested within the removed checkpoint tag. Thereafter, the transaction packet may be transmitted, or transferred, to another checkpoint device or the target checkpoint device. If no such match occurs between the checkpoint tag and the checkpoint identifier, the transaction packet may be sent to a quarantine unit. Before, during, or after the transfer of the transaction packet to either (i) a subsequent checkpoint device such as the target checkpoint device, or (ii) transfer of the transaction packet to the quarantine unit, the system may transmit a notification to an endpoint device and provide a user with a notification, and selections for how to proceed such that the user can override the system and send the transaction packet to the subsequent checkpoint device or the quarantine unit.

What is more, the present invention provides a technical solution to a technical problem. As described herein, the technical problem includes the inability for entities to maintain a secure routing of data through the entity systems without relying on external control solutions. Moreover, a user receiving the data currently has no ability to recognize the history of the data and therefore may question the legitimacy of the data. The technical solution presented herein allows for the data itself, in combination with the system, to direct the routing of the data through the entity network. The tags applied to the data also provide insight into the history of the data routing and any unforeseen mis-routing which may have occurred, thus increasing user confidence in the data itself. In particular, the system is an improvement over existing data routing solutions by routing data (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment for tracking data transferred in a distributed network via secured, layered data tagging 100, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory engine) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110.

Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B—a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C.

FIG. 2C illustrates an exemplary transaction packet of the distributed computing environment for tracking data transferred in a distributed network via secured, layered data tagging, in accordance with an embodiment of the invention. As shown in FIG. 2C, in some embodiments, an exemplary transaction packet 204B may encompass and therefore comprise transaction object 204A. In some embodiments, the transaction packet 204B may include a checkpoint tag group 210, which is a group of nested tags to identify the routing of the transaction packet 204, as will be described fully herein. The checkpoint tag group 210 may include layers of tags in a selected arrangement. In some embodiments, the checkpoint tags are layered (e.g., nested), such that only one tag is readable by a checkpoint device (via a checkpoint sensing engine associated with the checkpoint device), while the remaining tags within the checkpoint tag group 210 are obfuscated and/or unreadable due to their positioning underneath the outermost tag, as will be discussed in detail herein.

Additionally, or alternatively, in some embodiments the transaction packet 204B may include a data scoring tag group 212, which is one or more tags applied to the transaction packet 204B by the checkpoint sensing engine 131 as a result of an analysis to provide users and/or endpoint devices 140 with an indicator of the quality of the data held within the transaction packet 204B. The data scoring tag group 212 may include indicators of the quality of the underlying data within the transaction object data 208, such as indication that the transaction packet 204b has been routed through incorrect checkpoints during a data transfer process.

The checkpoint sensing engine 131 may recognize, as a result of the processes described herein, improper or corrected routing of the transaction packet 204B, as a result of any of the checkpoint tags of the transaction packet 204B not matching with the checkpoint device at which it is currently located. Accordingly, and in conjunction with a threshold set forth by a user, the checkpoint sensing engine 131 may apply a tag to the data scoring tag group 212 such as "verified" or "non-verified" according to the number of checkpoint devices through which the checkpoint sensing engine 131 did not produce a match between a checkpoint tag and the checkpoint device (e.g., a "mismatch"). For example, a threshold may be set by a user such that mismatches greater than 1 for any of the transfer of the transaction packet 204B prior to the instant checkpoint device results in an application of a "non-verified" data scoring tag into the data scoring tag group 212. This analysis may occur at each of the checkpoints along the route of the transaction packet 204B, or may be applied incrementally at certain checkpoint devices selected by a user, or alternatively the analysis may occur at the target endpoint device (e.g., the final checkpoint device along the transaction packet's route). The checkpoint sensing engine 131 may subsequently apply "verified" or "non-verified" as a data scoring tag to the transaction packet 204B as a result of the analysis by the checkpoint sensing engine 131.

Additionally, or alternatively, the data scoring tag group 212 may include tags related to the credibility of a source of the transaction packet 204B. For transaction packets 204B, especially those which originate outside the complete control or oversight of the entity, the entity may wish to apply data scoring tag(s) to indicate as such, for example a "high alert", or "low alert" tag. The entity may maintain a data attribute table where specific IP addresses, countries of origin, or a combination thereof are maintained by a user, and a user selects "high alert" or "low alert" for each of the IP addresses or countries of origin. Accordingly, when the checkpoint sensing engine 131 evaluates a checkpoint tag group 210 at a checkpoint device, the checkpoint sensing engine 131 may determine based on the previous hash 206A the IP address or country of origin of the transaction packet 204B, then subsequently query the data attribute table. If an identical IP address or country of origin exists on the data attribute table corresponding with an indicator such as, for example a "high alert", or "low alert", the checkpoint sensing engine 131 may subsequently apply the indicator as a data scoring tag to the transaction packet 204B.

As used herein, the term "transaction packet" may be used interchangeably with the term "data packet." Accordingly, both a "transaction packet" and a "data packet" may refer to the digital electronic data transmitted, stored, or amended within the distributed network 110. Once generated, the transaction packet 204B is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3 illustrates a block diagram of components of system 130, according to an embodiment of the invention. In some embodiments, the system 130 may include one or more checkpoint sensing engines 131 configured to detect and monitor communications between computing devices (e.g., the one or more endpoint devices 140) over a network (e.g., the network 110). The checkpoint sensing engines 131 may be operatively coupled to one or more computing devices to monitor network communications between endpoint devices 140. The one or more checkpoint sensing engines 131 may detect and monitor information (e.g., metadata) associated with network communications between endpoint devices 140. For example, the one or more checkpoint sensing engines 131 may detect and/or record packet header information containing metadata associated with a data transfer between endpoint devices 140. The packet header information may include server identifiers, port identifiers of servers, IP addresses, application identifiers, timestamps, packet information (e.g., the number of packets transferred), and the like. The one or more checkpoint sensing engines 131 may serve as "checkpoints" for proper routing and analytical evaluation of data transferred between a plurality of computing devices (e.g., the one or more endpoint devices 140 and/or servers) over a network (e.g., the network 110).

The checkpoint sensing engine 131 may further be configured to detect the data transferred between endpoint devices 140. In detecting and monitoring information (e.g., metadata, headers) associated with network communications between endpoint devices 140, checkpoint sensing engine 131 may detect (by collecting) each of the packets of data transferred. In some embodiments, the checkpoint sensing engine 131 may be configured to collect a sample of the data which passes through the checkpoint sensing engine 131, such that not all of the packets of data transferred are evaluated (as will be discussed in detail herein), but instead evaluated at a predetermined interval, such as 10 packets every second, one packet every second, one packet every minute, and so forth.

In some embodiments, after the one or more checkpoint sensing engines 131 detect, collect, and/or record packet header information via the network 110, the packet header information may be stored in storage device 106. In some embodiments, the aggregated packet header information may be stored in the storage device 106 associated with a specific checkpoint sensing engine (e.g., checkpoint sensing engine 131). Alternatively, storage device 106 may be externally located from the one or more checkpoint sensing engines 131. The packet header information may be stored in the unstructured state (e.g., raw network traffic data) in which it is gathered from the network (e.g., network 110). The checkpoint sensing engine 131 may be configured to evaluate the network communications (e.g., data transfer between computing devices such as server or endpoint devices). To evaluate the network communications, the checkpoint sensing engine 131 may evaluate the transaction packet, transaction object, or tags and/or data therein within each packet and compare the transaction packet, transaction object, or tags and/or data therein with information in the storage device 106, as will be discussed in detail herein.

In some embodiments, the system 130 may include a user interface engine 141, where one or more user interface screens of the user interface engine 141 are presented to a user via a display device coupled to a computing device (e.g., endpoint device 140 and/or system 130). The user interface engine 141 may enable one or more users to centrally access and/or analyze the information aggregated by system 130. One or users may configure one or more of the elements of the checkpoint sensing engine 131 or deconstruction engine 143 as described herein via the one or more user interface screens of the user interface engine 141. Further, in some embodiments, the user interface engine 141 may be configured to transmit one or more notifications to a user interface of an endpoint device and/or server to display, graphically or through audio device(s) a result of the comparison functions performed by the checkpoint sensing engine 131 (e.g., when a mismatch occurs, or a match occurs between a checkpoint device and a checkpoint tag).

As used herein, a "data transfer record" may refer to an aggregation of tag information stored in the storage device 106 by the checkpoint sensing engine 131 and/or deconstruction engine 143, which indicates the checkpoints through with a particular transaction packet has been transferred, and the data of corresponding transaction packets. The data transfer record may also include tag quality information of corresponding transaction packets stored in the memory device 106 by the checkpoint sensing engine 131 and/or deconstruction engine 143.

In some embodiments, the system 140 may include a deconstruction engine 143 configured to modify a transaction packet of the data as the data reaches a checkpoint or checkpoint sensing engine 131. As will be illustrated in detail herein, the deconstruction engine may remove (e.g., delete or erase) a checkpoint tag associated with a given checkpoint device at which the transaction packet has been received, thereby exposing an underlying checkpoint tag associated with a subsequent checkpoint device to which the transaction packet is to be transmitted (e.g., routed). The deconstruction engine 143 may be configured to deconstruct the outermost checkpoint tag (e.g., the checkpoint tag associated with the present checkpoint) and store the checkpoint tag in the storage device 106 for possible subsequent use by the checkpoint sensing engine 131, such as to aggregate information regarding the quantity of data being sent to the present checkpoint from a prior checkpoint. In some embodiments, the checkpoint tag which is stored in the storage device 106 may be coupled with a hash and/or timestamp for the transaction packet, which may be replicated and stored alongside the checkpoint tag deconstructed from the transaction packet. In this way, a user or the checkpoint sensing engine 131 may be able to aggregate information regarding the transaction packet such as to reconstruct a data flow (e.g., data transfer) history of the transaction packet for chain of custody analysis to determine the checkpoints through which the transaction packet was transferred throughout the data flow. Such an analysis may be referred to as the creation of a "transfer map" as used herein.

For a transfer map involving a depiction of data transfer between checkpoints, the deconstruction engine 143 and/or the checkpoint sensing engine 131 may be configured to generate a transfer map, where each of the checkpoints are represented as nodes and a directional link between the nodes that represents the data flow nature of the data transfer. The transfer map may include one or more selectable elements to be displayed on the user interface screen that may be selected via one or input devices. When selected, the selectable elements may display information associated with the selected server(s) and/or the data transfer(s) (e.g., the links between checkpoints). For example, at a user interface screen provided by the user interface engine 141, an individual (e.g., a system administrator) may select a checkpoint (e.g., a node) on the transfer map, which may cause the map to display information associated with the checkpoint (e.g., IP address, port identifiers, associated systems and/or applications, additional data transfers involving the selected checkpoint, quality metrics based on quality tags, and the like) from the storage device 106 and/or the storage device 106. Additionally, at a user interface screen provided by the user interface engine 141, a user may select a data transfer between checkpoints (e.g., a link) on the transfer map, which may cause the transfer map to display information associated with the data transfer (e.g., a time stamp, quality metrics based on quality tags, packet data for the data transfer, source and/or destination port identifiers, and the like).

In some embodiments, via inputs communicated to the user interface engine 141, a user may configure the deconstruction engine 143 and/or checkpoint sensing engine 131 to generate a transfer map depicting one or more data transfers. At a user interface screen, a user may select individual data transfer records to be included in a transfer map at the user interface engine 141. In some embodiments, an individual (e.g., system administrator) may select one or more data transfer records to be included in a generated transfer map based on the time stamp associated with the data transfer, the server(s) associated with the data transfer, the systems and/or applications associated with the server(s) involved in the data transfer, and the like. For example, a user may select a checkpoint for which to map data transfer operations for a given timeframe. The deconstruction engine 143 and/or checkpoint sensing engine 131 may be configured to access data transfer records in the storage device 106 and/or storage device 106 for the configured interval of time and generate a transfer map based on the associated data transfer records, where the transfer map is displayed by a user interface screen provided by the user interface engine 141. Additionally, for example, a user may select a cluster of checkpoints (e.g., multiple servers of system 130) for which to map data transfer operations. The deconstruction engine 143 and/or checkpoint sensing engine 131 may be configured to access data transfer records in the storage device 106 and/or storage device 106 for the configured cluster of servers and generate a transfer map for the associated data transfer records, where the transfer map is displayed by a user interface screen provided by the user interface engine 141.

FIG. 4 illustrates a block diagram of a checkpoint tag group 210, in accordance with an embodiment of the invention. The checkpoint tag group 210 may be comprised of layers of tags, the tags each assigned as alphanumeric text blocks according to the endpoint device 140 from which the transaction object 204A and/or transaction object data 208 originates. The endpoint device 140 from which the transaction object 204A and/or transaction object data 208 originates may have a predetermined requirement for an origin endpoint device 140A and a target endpoint device 140C, the target endpoint device 140C being the final destination of the transaction packet. The requirement for the originating and target endpoint devices may be due to strict security necessary for such transaction packet(s), thus the entity wishing to maintain control over the transaction packet throughout the transfer of the transaction packet from the origin endpoint device 140A to the target endpoint device 140C.

Accordingly, the transaction object 204A may be accompanied by the checkpoint tag group 210, such that the checkpoint tag group contains layers of checkpoint tags, each checkpoint tag layer corresponding to a checkpoint endpoint device 140 in between the origin endpoint device 140A and target endpoint device 140C. As one non-limiting example, three layers of checkpoint tags 210A, 210B, and 210C are illustrated in the exemplary checkpoint tag group 210 of FIG. 4. It shall be understood that checkpoint tag group 210 may include fewer or additional layers of checkpoint tags, such that fewer than three layers of checkpoint tags, or alternatively more than three layers of checkpoint tags are in checkpoint tag group 210. The number of checkpoint tag layers will be decided as a result of the number of checkpoints through which the transaction packet travels, as will be entered by a user onto a user interface of the endpoint device 140 prior to the transaction packet being transferred from the origin endpoint device 140A to the target endpoint device 140C.

FIG. 5 illustrates a block diagram of a deconstructing process for checkpoint tags, in accordance with an embodiment of the invention. A transaction packet originates at the origin endpoint device 140A, and is routed through (e.g., transferred) through an intermediate endpoint device 140B, before being routed to (e.g., transferred to) target endpoint device 140C. At the first checkpoint (e.g., the origin endpoint device 140A), the checkpoint sensing engine 131 reads a first checkpoint tag 210A (e.g., "checkpoint A tag"). The checkpoint sensing module, in reading the first checkpoint tag 210A, will compare a checkpoint identifier at the first checkpoint device (e.g., the origin endpoint device 140A) with the first checkpoint tag 210A. For example, the origin endpoint device 140A may have a unique internet protocol ("IP") address, while the first checkpoint tag 210A lists this IP address in alphanumeric characters. The system 130, via the checkpoint sensing engine 131 may parse the first checkpoint tag 210A and compare a first character of the IP address (e.g., the first character of the first checkpoint tag 210A) to the first character of the checkpoint identifier of the origin endpoint device 140A). If the two characters are identical, the system then moves to the second character, and so forth. If the entire string (e.g., the IP address) of the first checkpoint tag 210A is determined to be identical to the entire string of the checkpoint identifier of the origin endpoint device 140A (e.g., the first checkpoint identifier), then it is assumed that the transaction packet is in the proper location by the system 130. Thereafter, the deconstruction engine 143 deletes (e.g., removes) the first checkpoint tag 210A from the transaction packet.

Although the aforementioned example involves the first checkpoint tag 210A consisting of an IP address, in some embodiments of the invention, checkpoint tags (such as, but not limited to first checkpoint tag 210A, second checkpoint tag 210B, and/or third checkpoint tag 210C) may not be IP addresses, and may instead be uniquely generated alphanumeric codes generated by the system at random. For example, the system may generate an 8-character code that corresponds to an identical 8-character checkpoint identifier code, wherein the checkpoint identifier(s) are stored in a table to correlate the checkpoint identifier(s) with a specific endpoint device, such as through correlation with IP addresses, MAC addresses, or the like. Additionally, in some embodiments, the checkpoint tag(s) may be encrypted by the system prior to applying the checkpoint tag(s). The key related to the decryption of the checkpoint tag(s) may similarly be stored in a table, such that during each verification (e.g., comparison) of a checkpoint tag with the checkpoint device, the checkpoint sensing engine 131 may query the table and retrieve a corresponding key to decrypt the checkpoint tag prior to validating (e.g., comparing) the checkpoint tag to the checkpoint device. In this way, nefarious actors who may unintentionally receive transaction packet(s) will be unaware of the checkpoint device routing intended for the transaction packet.

In some embodiments, the deconstruction engine 143 may transfer the first checkpoint tag 210A (or a duplicate thereof), along with a duplicated portion of the transaction header (such as previous hash 206A, nonce 206B, hash 206C, and/or time stamp 206D), coupled together, to the storage device 106. In this way, the system 130 or a user thereof may be able to independently verify the location (e.g., the checkpoint) at which the transaction packet has been. If a timestamp, such as timestamp 106D is included in the storage device 106, the system 130 and/or user will know a time at which the transaction packet was at the first checkpoint device. Accordingly, the same process using the deconstruction engine 143 may occur for subsequent checkpoints, and if any subsequent transfers of the transaction packet occur, as are described in detail herein, the transfer history, including the times at each checkpoint device, and direction of flow of the transaction packet may be determined based on an aggregation of data. For example, a hash 206C and previous hash 206A may be used to map the transaction packet transfer routing, along with the verification of where the hash(es) was assigned, based on the checkpoint device(s) through which the transaction packet was passed.

It shall be appreciated that after the first checkpoint tag 210A has been removed from the transaction packet, the outermost checkpoint tag is the second checkpoint tag 210B. Similar to that of the origin endpoint device 140A, at a second checkpoint (e.g., an intermediary endpoint device 140B), the checkpoint sensing engine 131 reads a second checkpoint tag 210B (e.g., "checkpoint B tag"). The checkpoint sensing module, in reading the second checkpoint tag 210B, will compare a checkpoint identifier at the second checkpoint device (e.g., the intermediary endpoint device 140B) with the second checkpoint tag 210B. For example, the intermediary endpoint device 140B may have a unique internet protocol ("IP") address, while the second checkpoint tag 210B lists this IP address in alphanumeric characters. The system 130, via the checkpoint sensing engine 131 may parse the second checkpoint tag 210B and compare a first character of the IP address (e.g., the first character of the second checkpoint tag 210B) to the first character of the checkpoint identifier of the intermediary endpoint device 140B). If the two characters are identical, the system then moves to the second character, and so forth. If the entire string (e.g., the IP address) of the second checkpoint tag 210B is determined to be identical to the entire string of the checkpoint identifier of the intermediary endpoint device 140B (e.g., the second checkpoint identifier), then it is assumed that the transaction packet is in the proper location by the system 130. Thereafter, the deconstruction engine 143 deletes (e.g., removes) the second checkpoint tag 210B from the transaction packet and may store the second checkpoint tag 210B in the memory device 106. As previously described, various other identification details of the second checkpoint device and/or transaction packet may also be stored in the memory device 106.

It shall be understood that in some embodiments of the invention, no such intermediary endpoint device 140B exists, as the transaction packet is configured to be sent directly from the origin endpoint device 140A to the target endpoint device 140C. Alternatively, a plurality of intermediary endpoint devices 140B may be positioned between the origin endpoint device 140A and the target endpoint device 140C, each intermediary endpoint device 140B having a corresponding checkpoint tag associated with it on the transaction packet.

Similar to that of the intermediary endpoint device 140B, at a final checkpoint (e.g., an target endpoint device 140C), the checkpoint sensing engine 131 reads a third checkpoint tag 210B (e.g., "checkpoint B tag"). The checkpoint sensing module, in reading the third checkpoint tag 210B, will compare a checkpoint identifier at the third checkpoint device (e.g., the target endpoint device 140C) with the third checkpoint tag 210B. For example, the target endpoint device 140C may have a unique internet protocol ("IP") address, while the third checkpoint tag 210B lists this IP address in alphanumeric characters. The system 130, via the checkpoint sensing engine 131 may parse the third checkpoint tag 210B and compare a first character of the IP address (e.g., the first character of the third checkpoint tag 210B) to the first character of the checkpoint identifier of the target endpoint device 140C). If the two characters are identical, the system then moves to the third character, and so forth. If the entire string (e.g., the IP address) of the third checkpoint tag 210B is determined to be identical to the entire string of the checkpoint identifier of the target endpoint device 140C (e.g., the third checkpoint identifier), then it is assumed that the transaction packet is in the proper location by the system 130. Thereafter, the deconstruction engine 143 deletes (e.g., removes) the third checkpoint tag 210B from the transaction packet and may store the third checkpoint tag 210C in the memory device 106. As previously described, various other identification details of the third checkpoint device and/or transaction packet may also be stored in the memory device 106.

FIG. 6 illustrates a process flow 600 for tracking data transferred in a distributed network via secured, layered data tagging, in accordance with an embodiment of the invention. The process may begin at block 602, wherein the checkpoint sensing engine 131 collects data flow at a first checkpoint device (e.g., origin checkpoint device 140A). The data flow is related to traffic on network 110 passing from the first checkpoint device to a second checkpoint device (e.g., target checkpoint device 140C). As previously described, the data flow comprises at least one transaction packet 204B. In some embodiments, the checkpoint sensing engine 131 only evaluates a single transaction packet 204B at a time, while in other embodiments the checkpoint sensing engine 131 is configured to evaluate multiple transaction packets simultaneously. The transaction packet may include a checkpoint tag group 210. As previously described, the checkpoint tag group 210 may include one or more checkpoint tags. In some embodiments, the transaction packet may also include at least one data scoring tag group 212 which may include data scoring tags.

The process may continue at block 604A, where the checkpoint sensing engine 131 verifies a match between a checkpoint tag (e.g., a first checkpoint tag) and a checkpoint identifier (e.g., a checkpoint identifier at a first checkpoint device). At the first checkpoint (e.g., the origin endpoint device 140A), the checkpoint sensing engine 131 reads a first checkpoint tag 210A (e.g., "checkpoint A tag"). The checkpoint sensing module 131, in reading the first checkpoint tag 210A, will compare a checkpoint identifier at the first checkpoint device (e.g., the origin endpoint device 140A) with the first checkpoint tag 210A. For example, the first checkpoint may have a unique internet protocol ("IP") address, while the first checkpoint tag 210A lists this IP address in alphanumeric characters. The system 130, via the checkpoint sensing engine 131 may parse the first checkpoint tag 210A and compare a first character of the IP address (e.g., the first character of the first checkpoint tag 210A) to the first character of the checkpoint identifier of the first checkpoint device. If the two characters are identical, the system then moves to the second character, compares the second characters, and so forth. If the entire string (e.g., the IP address) of the first checkpoint tag 210A is determined to be identical to the entire string of the checkpoint identifier of the first checkpoint identifier, then it is assumed that the transaction packet is in the proper location by the checkpoint sensing module 131. Thereafter, the deconstruction engine 143 deletes (e.g., removes) the first checkpoint tag 210A from the checkpoint tag group 210 of the transaction packet.

In some embodiments, checkpoint tags (such as, but not limited to first and second checkpoint tags) may not be IP addresses, and may instead be uniquely generated alphanumeric codes generated by the system at random. For example, the system may generate an 8-character code that corresponds to an identical 8-character checkpoint identifier code, wherein the checkpoint identifier(s) are stored in a table to correlate the checkpoint identifier(s) with a specific endpoint device, such as through correlation with IP addresses, MAC addresses, or the like. The system may have previously applied such checkpoint tag to the checkpoint tag group 210 prior to the transfer of the transaction packet 204B. As such, the checkpoint sensing engine may query the table with the instant checkpoint tag, and after searching for identical matches in the table, return a value of the checkpoint identifier to parse and compare (e.g., verify) with the now-decoded checkpoint tag, digit by digit, in the manner as previously described with respect to earlier examples.

Additionally, in some embodiments, the checkpoint tag(s) may be encrypted by the system prior to applying the checkpoint tag(s). The key related to the decryption of the checkpoint tag(s) may similarly be stored in a table, such that during each verification (e.g., comparison) of a checkpoint tag with the checkpoint device, the checkpoint sensing engine 131 may query the table and retrieve a corresponding key to decrypt the checkpoint tag prior to verifying (e.g., comparing) the checkpoint tag to the checkpoint device. In this way, nefarious actors who may unintentionally receive transaction packet(s) will be unaware of the checkpoint device routing intended for the transaction packet.

In some embodiments, the process may continue at block 604B, where the system compares portions of the transaction object heater 206 to a data attribute table to apply data scoring tag(s). In some embodiments the checkpoint sensing engine 131 may also assess the credibility of a source of the transaction packet, such as by applying a "high alert", or "low alert" tag as previously described herein. The entity may maintain a data attribute table where specific IP addresses, countries of origin, or a combination thereof are maintained by a user, and a user selects "high alert" or "low alert" for each of the IP addresses or countries of origin. Accordingly, the checkpoint sensing engine 131 may read the previous hash 206A the IP address or country of origin of the transaction packet, then subsequently query the data attribute table. If an identical IP address or country of origin exists on the data attribute table corresponding with an indicator such as, for example a "high alert", or "low alert", the checkpoint sensing engine 131 may subsequently apply the indicator as a data scoring tag to the data scoring tag group of the transaction packet.

The process may continue in block 606 where if a no match occurs between the first checkpoint tag and the checkpoint identifier of the first checkpoint device, the transaction packet 204B is transmitted to a quarantine unit, such as a specified repository in storage device 106 for inspection by a user. In some embodiments, the system may have multiple quarantine units, such as one quarantine unit per checkpoint device, while in other embodiments, the system may have a centralized quarantine unit to store transaction packets 204B where no match (e.g., a mismatch) has occurred.

The process may continue in block 608, where the system (in some embodiments, the checkpoint sensing engine 131) transmits a notification to a user interface of an endpoint device 140. The notification may be displayed graphically on a user interface of the endpoint device 140. The notification may include an identification of a match or no match (e.g., a match or a mismatch). Further, the notification may also include a disposition feature, such as one or more buttons for a user to interact with, with a first selection and a second selection ("accept" and "reject" as two non-limiting examples). The disposition feature may interact with (e.g., be operatively coupled to) the checkpoint sensing engine 131 execute the actions selected by a user on the disposition feature of the notification.

For example, if in block 604A the system does not verify a match between a checkpoint tag and a checkpoint identifier (e.g., no match) the disposition feature may provide the user with options to (i) accept the transmitting (e.g., transferring) of the transaction packet from the first checkpoint device to a quarantine unit if there is no match between the checkpoint identifier of the first checkpoint device and the first checkpoint tag, and (ii) reject the transmitting (e.g., transferring) of the transaction packet from the first checkpoint device to a quarantine unit, and instead remove the checkpoint tag as illustrated in block 610 and transmit the transaction packet to the second checkpoint device.

If, however, in block 604A the system verifies a match between a checkpoint tag and a checkpoint identifier, the disposition feature may instead provide the user with options to (i) accept the removal of the first checkpoint tag, as is illustrated in block 610, and (ii) reject the removal of the first checkpoint tag and subsequently transmit the transaction packet from the first checkpoint device to the quarantine unit, as illustrated in block 606.

The process may continue in block 610, where the deconstruction engine removes the checkpoint tag from the transaction packet. If there is a match that is verified by the checkpoint sensing engine 131 between the checkpoint tag and the checkpoint identifier of the checkpoint device, or if manually asserted through the notification as illustrated in block 608, the deconstruction engine removes the outermost checkpoint tag (e.g., the first checkpoint tag) of the transaction packet(s), as previously described in detail herein. The checkpoint sensing engine 131 may move this removed checkpoint tag to the storage device for use with other purposes, such as creation of a transfer map, which illustrates graphically the checkpoints through which a transaction packet has traveled (displayed as nodes on a graph) and lines interconnecting the nodes with directionality determined based on the time at which the checkpoint tag was entered into the storage device 106. The removal of the first checkpoint tag, in conjunction with the architecture of the transaction packet as described herein, allows for the exposure of an underlying checkpoint tag (e.g., a second checkpoint tag) that is associated with a second checkpoint device to which the transaction packet is to be transferred subsequently.

The process may continue at block 612, where the system transmits the transaction packet to a second checkpoint device (e.g., a target checkpoint device). Accordingly, after the exposing of the second checkpoint tag, the checkpoint sensing engine 131 and/or the system may transfer (e.g., transmit) the transaction packet to the second checkpoint device. The transferring of the transaction packet is dictated by the second checkpoint tag, which identifies the target location of the subsequent transfer between checkpoint devices. In some embodiments, the checkpoint sensing engine 131 may first decrypt the second checkpoint tag (using the key in the table as previously described) to properly identify the second checkpoint device prior to transferring the transaction packet, and in some embodiments the checkpoint sensing engine 131 may subsequently encrypt or re-encrypt the second checkpoint tag prior to transferring to the second checkpoint device.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for tracking data transferred in a distributed network via secured, layered data tagging, the system comprising:
   at least one non-transitory storage device comprising instructions; and
   at least one processing device coupled to the at least one non-transitory storage device, wherein when executed by the processing device, the instructions cause the processing device to perform the steps of:
   collecting, by a checkpoint sensing engine, data flow at a first checkpoint device, the data flow relating to network traffic passing from the first checkpoint device to a second checkpoint device, wherein the data flow comprises at least one transaction packet, the at least one transaction packet comprising a checkpoint tag group, wherein the checkpoint tag group comprises at least one checkpoint tag;
   verifying, by the checkpoint sensing engine, a match between a first checkpoint tag of the at least one transaction packet and a checkpoint identifier of the first checkpoint device;
   transmitting a notification to an endpoint device, the notification comprising an identification of the match or no match, wherein if there is a match between the checkpoint identifier of the first checkpoint device and the first checkpoint tag, the notification comprises a disposition feature comprising a first selection and a second selection, the disposition feature configured to communicate with the checkpoint sensing engine to:
      accept, as a result of the first selection, a removal of the first checkpoint tag; and
      reject, as a result of the second selection, the removal of the first checkpoint tag, and subsequently transmit the at least one transaction packet from the first checkpoint device to a quarantine unit;
   displaying the notification on a user interface of the endpoint device;
   removing, by a tag deconstruction engine, the first checkpoint tag of the at least one transaction packet upon a verification of a match between the first checkpoint tag and the checkpoint identifier, wherein the removing of the first checkpoint tag exposes a second checkpoint tag, the second checkpoint tag nested within the first checkpoint tag and corresponding to a checkpoint identifier of the second checkpoint device; and
   transmitting the at least one transaction packet to the second checkpoint device.

2. The system of claim 1, wherein the instructions further cause the processing device to perform the steps of:
   transmitting the at least one transaction packet from the first checkpoint device to a quarantine unit if there is a no match between the checkpoint identifier of the first checkpoint device and the first checkpoint tag.

3. The system of claim 2, wherein if there is no match between the checkpoint identifier of the first checkpoint device and the first checkpoint tag, the notification comprises a disposition feature comprising a first selection and a second selection, the disposition feature configured to communicate with the checkpoint sensing engine to:
   accept, as a result of the first selection, the transmitting of the transaction packet from the first checkpoint device to a quarantine unit; and
   reject, as a result of the second selection, the transmitting of the transaction packet from the first checkpoint device to a quarantine unit, and instead remove the first checkpoint tag and transmit the at least one transaction packet to the second checkpoint device.

4. The system of claim 1, wherein the at least one transaction packet further comprises at least one data scoring tag.

5. The system of claim 4, wherein the checkpoint sensing engine applies the at least one data scoring tag resulting from a match between a transaction object header and a data attribute table.

6. A computer program product for tracking data transferred in a distributed network via secured, layered data tagging, the computer program product comprising a non-transitory computer-readable medium comprising code causing a first apparatus to:
- collect, by a checkpoint sensing engine, data flow at a first checkpoint device, the data flow relating to network traffic passing from the first checkpoint device to a second checkpoint device, wherein the data flow comprises at least one transaction packet, the at least one transaction packet comprising a checkpoint tag group, wherein the checkpoint tag group comprises at least one checkpoint tag;
- verify, by the checkpoint sensing engine, a match between a first checkpoint tag of the at least one transaction packet and a checkpoint identifier of the first checkpoint device;
- transmit a notification to an endpoint device, the notification comprising an identification of the match or no match, wherein if there is a match between the checkpoint identifier of the first checkpoint device and the first checkpoint tag, the notification comprises a disposition feature comprising a first selection and a second selection, the disposition feature configured to communicate with the checkpoint sensing engine to:
  - accept, as a result of the first selection, a removal of the first checkpoint tag; and
  - reject, as a result of the second selection, the removal of the first checkpoint tag, and subsequently transmit the at least one transaction packet from the first checkpoint device to a quarantine unit;
- display the notification on a user interface of the endpoint device;
- remove, by a tag deconstruction engine, the first checkpoint tag of the at least one transaction packet upon a verification of a match between the first checkpoint tag and the checkpoint identifier, wherein the removing of the first checkpoint tag exposes a second checkpoint tag, the second checkpoint tag nested within the first checkpoint tag and corresponding to a checkpoint identifier of the second checkpoint device; and
- transmit the at least one transaction packet to the second checkpoint device.

7. The computer program product of claim 6, wherein the code further causes the first apparatus to:
- transmit the at least one transaction packet from the first checkpoint device to a quarantine unit if there is a no match between the checkpoint identifier of the first checkpoint device and the first checkpoint tag.

8. The computer program product of claim 7, wherein if there is no match between the checkpoint identifier of the first checkpoint device and the first checkpoint tag, the notification comprises a disposition feature comprising a first selection and a second selection, the disposition feature configured to communicate with the checkpoint sensing engine to:
- accept, as a result of the first selection, the transmitting of the transaction packet from the first checkpoint device to a quarantine unit; and
- reject, as a result of the second selection, the transmitting of the transaction packet from the first checkpoint device to a quarantine unit, and instead remove the first checkpoint tag and transmit the at least one transaction packet to the second checkpoint device.

9. The computer program product of claim 6, wherein the at least one transaction packet further comprises at least one data scoring tag.

10. The computer program product of claim 9, wherein the checkpoint sensing engine applies the at least one data scoring tag resulting from a match between a transaction object header and a data attribute table.

11. A method for tracking data transferred in a distributed network via secured, layered data tagging, the method comprising:
- collecting, by a checkpoint sensing engine, data flow at a first checkpoint device, the data flow relating to network traffic passing from the first checkpoint device to a second checkpoint device, wherein the data flow comprises at least one transaction packet, the at least one transaction packet comprising a checkpoint tag group, wherein the checkpoint tag group comprises at least one checkpoint tag;
- verifying, by the checkpoint sensing engine, a match between a first checkpoint tag of the at least one transaction packet and a checkpoint identifier of the first checkpoint device;
- transmitting a notification to an endpoint device, the notification comprising an identification of the match or no match, wherein if there is a match between the checkpoint identifier of the first checkpoint device and the first checkpoint tag, the notification comprises a disposition feature comprising a first selection and a second selection, the disposition feature configured to communicate with the checkpoint sensing engine to:
  - accept, as a result of the first selection, a removal of the first checkpoint tag; and
  - reject, as a result of the second selection, the removal of the first checkpoint tag, and subsequently transmit the at least one transaction packet from the first checkpoint device to a quarantine unit;
- displaying the notification on a user interface of the endpoint device;
- removing, by a tag deconstruction engine, the first checkpoint tag of the at least one transaction packet upon a verification of a match between the first checkpoint tag and the checkpoint identifier, wherein the removing of the first checkpoint tag exposes a second checkpoint tag, the second checkpoint tag nested within the first checkpoint tag and corresponding to a checkpoint identifier of the second checkpoint device; and
- transmitting the at least one transaction packet to the second checkpoint device.

12. The method of claim 11, further comprising:
- transmitting the at least one transaction packet from the first checkpoint device to a quarantine unit if there is a no match between the checkpoint identifier of the first checkpoint device and the first checkpoint tag.

13. The method of claim 12, wherein if there is no match between the checkpoint identifier of the first checkpoint device and the first checkpoint tag, the notification comprises a disposition feature comprising a first selection and a second selection, the disposition feature configured to communicate with the checkpoint sensing engine to:
- accept, as a result of the first selection, the transmitting of the transaction packet from the first checkpoint device to a quarantine unit; and
- reject, as a result of the second selection, the transmitting of the transaction packet from the first checkpoint device to a quarantine unit, and instead remove the first checkpoint tag and transmit the at least one transaction packet to the second checkpoint device.

14. The method of claim 11, wherein the at least one transaction packet further comprises at least one data scoring tag.

15. The method of claim 14, wherein the checkpoint sensing engine applies the at least one data scoring tag resulting from a match between a transaction object header and a data attribute table.

* * * * *